United States Patent [19]
Baum et al.

[11] 3,908,969
[45] Sept. 30, 1975

[54] METHOD AND APPARATUS FOR AIR POLLUTION CONTROL COMBINED WITH SAFE RECOVERY AND CONTROL OF GASES FROM A BOTTOM-BLOWN STEEL CONVERTER VESSEL

[75] Inventors: Kurt Baum; Joerg Peter Baum, both of Essen-Sud, Germany; Jai Kumar Pearce; David Lee Schroeder, both of Pittsburgh, Pa.

[73] Assignee: Pennsylvania Engineering Corporation, Pittsburgh, Pa.

[22] Filed: Mar. 12, 1973

[21] Appl. No.: 340,302

Related U.S. Application Data

[63] Continuation of Ser. No. 209,953, Dec. 20, 1971, abandoned.

[52] U.S. Cl. ................................................. 266/17
[51] Int. Cl.² .......................................... C21C 5/40
[58] Field of Search ................ 266/15, 16, 35, 36 P; 75/60

[56] References Cited
UNITED STATES PATENTS

| | | | |
|---|---|---|---|
| 1,505,281 | 8/1924 | Nagelvoort | 266/35 |
| 3,118,759 | 1/1964 | Okaniwa et al. | 266/35 X |
| 3,173,489 | 3/1965 | Okaniwa et al. | 75/60 X |
| 3,177,065 | 4/1965 | Okaniwa et al. | 266/35 X |
| 3,190,747 | 6/1965 | Namy et al. | 266/16 X |
| 3,220,826 | 11/1965 | Okaniwa et al. | 266/35 X |
| 3,271,129 | 9/1966 | Maehara et al. | 75/60 |
| 3,330,645 | 7/1967 | Moustier et al. | 266/35 X |
| 3,592,630 | 7/1971 | Willett | 75/60 |
| 3,653,650 | 4/1972 | Iwgo et al. | 266/35 |
| 3,706,549 | 12/1972 | Knuppel et al. | 266/35 X |

FOREIGN PATENTS OR APPLICATIONS

| | | | |
|---|---|---|---|
| 46-11407 | 5/1967 | Japan | 266/16 |

*Primary Examiner*—Gerald A. Dost
*Attorney, Agent, or Firm*—Fred Wiviott

[57] ABSTRACT

A gas collector hood is located close to the mouth of a converter vessel and has a diameter which is not much greater than the mouth of the vessel. A mixture of oxygen together with entrained powered materials based on process requirements and a hydrocarbon fluid as cooling agent are blown through tuyeres in the bottom of the vessel and diffuse through the hot metal in the vessel. The inherently finer dust produced from the bottom-blown oxygen process requires that for proper air pollution control a non-combustion system be used to take advantage of the increased agglomerating properties of iron oxides when produced in reducing atmospheres. When blowing is initiated in this process carbon monoxide and hydrogen evolve immediately and in order to render the gases inert, air is aspirated into the gas collector hood so that an inert gas plug is formed which purges the exhaust system of combustion air. A short time after blowing is initiated, the hood is brought down to proximity with the vessel in which case only a small percentage of the theoretically required air for combustion is aspirated. Nitrogen is injected as required into the hood in addition to air aspirated to artifically create inertization to turn down a heat at high carbon levels, for emergency vessel turn down, and for special heats. Near the end of a normal low carbon heat, air is again aspirated into the hood so that an inert gas plug is formed for safe turn down of the converter. Control of the system is achieved through high response sensors based on a gas analysis system independent of the components and products of combustion in the gas phase, operated together with automatic suction control incorporated as part of the gas cleaning system.

45 Claims, 4 Drawing Figures

METHOD AND APPARATUS FOR AIR POLLUTION CONTROL COMBINED WITH SAFE RECOVERY AND CONTROL OF GASES FROM A BOTTOM-BLOWN STEEL CONVERTER VESSEL

This is a continuation, of application Ser. No. 209,953, filed Dec. 20, 1971, and now abandoned.

BACKGROUND OF THE INVENTION

The present invention pertains to the bottom-blown oxygen steelmaking method of converting impure molten iron to steel and is particularly concerned with safe and economic collection of the gases which are evolved in the process and which have to be cleaned before discharge to the atmosphere and/or used as fuel. The analysis of the gases is used to control the collection and gas cleaning.

In the bottom-blown oxygen steelmaking process, with which the present invention is concerned, the refractory lined converter vessel has tuyeres in its bottom so that oxygen, other gases such as hydrocarbon cooling fluids, and powdered fluxes and other additives needed for the conversion process may be introduced through the bottom of the vessel and diffused through the melt. This contrasts with the well-established top-blown oxygen conversion process where oxygen is injected into the melt by means of a lance which extends through the mouth of the vessel to near the surface of the melt. In the top-blown process, the fluxes and other materials are also admitted through the mouth of the vessel to the top surface of the melt.

In both the top and bottom-blown processes, oxygen ($O_2$) reacts with silicon, manganese, carbon and phosphorus in the melt during the blowing period. In the bottom-blown process, oxygen ($O_2$) also reacts with hydrogen resulting as a decomposition product from the hydrocarbon fluids injected in the bottom. The duration of blowing or end point of the heat is indicated by the reduction of carbon oxidation products (CO & $CO_2$) in the evolved gases which means that the carbon content of the melt has been reduced to the desired level and that the melt may be poured provided that is temperature is correct.

In both processes gases are evolved during the blow period. The primary gases in the bottom-blown processes are carbon monoxide (CO), carbon dioxide ($CO_2$), hydrogen ($H_2$) and water vapor ($H_2O$) which may vary in proportion as the melt proceeds. In general these primary gases are directed into a hood over the vessel. The hood is spaced from the vessel so air enters and burns the CO and $H_2$ in the gas and the products of combustion are conducted through an off-gas cleaning system with an exhaust fan, and then led to a chimney and discharged to the atmosphere as waste.

In such a combustion system, iron vaporized from the bath in localized high temperature zones, and such iron that is discharged as oxide, is completely oxidized to red fume ($Fe_2O_3$) and diluted by combustion air and excess air. The gas cleaning system required to clean such fine red fume and high volumes of resulting off-gases is voluminous and costly due to high fan capacity and power consumption resulting from high pressure drop required to achieve air pollution standards.

The bottom-blown oxygen process in comparison to the top-blown, is characterized by a smaller percentage of iron vaporized but in an extremely fine dispersion of the iron particles. Therefore, a noncombustion system has to be used in order to avoid oxidation and further dilution with air, and to take advantage of the increased agglomeration and wetting properties of dust particles comprised largely of non or semi-oxidized iron (Fe, FeO and $Fe_3O_4$) prevailing under reducing conditions. Besides the economic advantages of such a system, it provides the release of the lowest possible gas volumes with minimum concentration of dust in the exhauasted stack gases. This ensures that all applicable pollution code standards can be economically met.

An associated objective of such a non-combustion gas cleaning system in conjunction with the bottom-blown oxygen steelmaking process, is the safe capture and possible utilization of relatively high calorific value off-gasses produced during the blow. This is achieved through automatic switching in such manner that during the beginning and end of a blow, when off-gases have a relatively low calorific value, they are cleaned and discharged to a waste gas stack equipped with a torch burner; while during interim periods of the blow when the off-gases have a high calorific value they are cleaned and stored for external utilization. There are thus three distinct periods. A first period of exhaust and discharge to the atmosphere, a second period of collection of gases for use, and a third period when gases are again exhausted and discharged to the atmosphere. By controlling the duration of the second period of collection it is possible to obtain a gas the calorific value of which can be set at various desired values.

In this invention a scheme is proposed for avoiding combustion of the evolved gases in the bottom-blown process and particularly for collecting the gases when the CO and $H_2$ concentration is about 30% at which time the gas mixture is combustible. This gas mixture is therefore subject to combustion and even explosion in the hood and gas cleaning system if sufficient oxygen is present. The problem with collecting the evolved reaction gases is that the gases are at about 1,400°–1600°C at the mouth of the vessel and would further increase with combustion at the air gap between vessel mouth and hood. Gases must therefore be cooled sufficiently by radiation to about 1,100°C in order to reduce the steam content that would otherwise result from subsequent quenching in the wet gas cleaning system. Cooling is effected by using a water cooled hood and stack in order to lower the temperature of the gas mixture. If required, under special circumstances when unusually high CO and $H_2$ evolution occurs early in the heat, nitrogen will be injected in the hood for inertization of the primary gases to a non-explosive level, and simultaneously providing the benefits of cooling.

The safe capture and efficient operation of the gas cleaning system and complete collection of gases therefore requires that combustion at the air gap between hood and vessel mouth be kept to a minimum after taking necessary precautions to ensure that no explosive conditions are prevalent in the system. Furthermore, controls are required to avoid leakage of gas and fumes to the atmosphere in the gap between vessel and hood resulting from process variations and fluctuations in evolved gas volumes within the vessel. Hitherto, this has been a major disadvantage in full combustion systems where such control is not possible and consequently adds to air pollution.

SUMMARY OF THE INVENTION

An object of the present invention is to provide a means for economic and efficient pollution control on a bottom-blown oxygen converter vessel, with simultaneous provisions for safe capture and collection of uncombusted high calorific value waste gases. The benefits derived from use of such collected gases will significantly enhance economics by reducing the costs required to meet air pollution standards.

A further object is to provide a method for operating the oxygen converter vessel so that gas combustion does not occur at the vessel mouth and, hence, the evolved gases can be analyzed and used to control or indicate the status of the heat.

Another object is to use ratios of the concentrations of different gases for developing indicia and functionally related electric signals which are used to control the gas collection and cleaning system and to indicate the status of the melt.

Another object is to have the gas analysis system be independent of the components and products of combustion of the gas phase such as hydrogen, water vapor, carbon monoxide and carbon dioxide normally prevalent in the bottom-blown oxygen process using hydrocarbon fluids. Such analysis system providing for the necessary high response signals to enable control that is compatible with fluctuations within the process.

A further object is to use the relatively rapid measurement of oxygen partial pressure (less than one second) as a means to determine the combustion stoichiometry of the gas phase and to utilize such signals to control the gas collection and cleaning process.

A further object is to combine the oxygen partial pressure sensor together with an infra-red sensor (which measures CO, $CO_2$ and $H_2O$ within a sensor response of less than 5 seconds) to determine and control calorific value of the off-gases and for control of automatic switching to collect gases of pre-determined heating value from bottom-blown oxygen steelmaking vessels using hydrocarbon fluids.

Another object is to use the combined signals from the oxygen partial pressure and infra-red sensors to control the movements of a hood skirt which sets the size of air gap between the hood and the vessel mouth.

Still another object is to control the size of the gap between the hood and vessel mouth as well as the suction or negative pressure of the gas stream within the hood which leads the gases away from the vessel so that limited air is drawn into the combustible gas stream.

Yet another object is to use the signal from the gas analysis system together with signals from the pressure control system as a means to supervise system control.

Still another object is to provide a method which will permit voluntary or involuntary safe stopping of the blowing process where levels of CO and $H_2$ in gases are high such as is the case when high carbon heat is to be made, and when inertization of gases in the system are required to prevent explosion on turn down.

Yet another object is to use the signals from the oxygen pressure sensor to detect the presence of free oxygen when high CO and $H_2$ conditions prevail to initiate nitrogen injection for safety inertization.

Yet another object is to provide for additional air pollution devices integrated with the main gas collection and cleaning system that will collect fumes when the bottom-blown oxygen vessel is in a non-blowing position tilted away from the vertical and is out of coincidence with the main collection hood.

How these and other more specific objects are achieved will appear from time to time in the detailed description of an illustrative embodiment of the invention which will be set forth hereinafter.

In accordance with the invention, a bottom-blown oxygen converter vessel is equipped with a water-cooled gas collecting hood. There is a small gap between the vessel and hood when the blowing process is underway. The hood is connected to a duct and gas cleaning apparatus through an exhaust fan which delivers a relatively constant pressure over a range of off-gas flow rates. Since the gas evolution from the process is varying over the blow period, the air aspirated through the gap between vessel mouth and hood must be controlled. This is done by means of varying and setting the air gap between vessel mouth and hood through a moveable hood skirt, and then providing for finer operational corrections through flow control obtained by varying the adjustable throat section of the venturi scrubber incorporated as part of the gas cleaning system. During the first minute or two of the oxygen blow, when the quantity of evolved gases is low, CO and $H_2$ evolution is relatively low. Air aspirated in the gap with skirt in a raised position permits full combustion to $CO_2$ and $H_2O$, the remainder being nitrogen. The mixture of $CO_2$ and $H_2O$ and $N_2$ is inert and non-combustible. At this stage the gas acts like an inert plug which flows through the gas cleaning system and apparatus, purging it of oxygen of combustion. The inert plug of gas is directed to a waste stack.

An oxygen partial pressure sensor, $PO_2$, detects when the stoichiometric combustion point of the gases is reached. At this point the vessel hood skirt is lowered and safe capture of waste gases for exhaust to the stack burner may be initiated without a danger of explosion.

More specifically, as the initial period of a heat progresses, the combined CO and $H_2$ concentration of the evolved gases increases markedly and combined $CO_2$ and $H_2O$ concentration decreases. Since the volume of gas flow in this initial period is set by a pre-set position of the variable venturi throat, air intake must necessarily be reduced at this time. The oxygen partial pressure sensor detects the stoichiometric combustion point and thereby the absence of oxygen in the system and causes the hood to be lowered to a point at which the pressure drop in the gap between vessel mouth and hood skirt will create a negative pressure within the hood that corresponds to a pre-set pressure value in the range of $-3$ to $-8$ mm W.G. This provides a means for automatic closure of the hood skirt in a safe manner much earlier in the blow period than has hitherto been possible. The result is the ability to safely collect larger volumes of combustible gas per ton of steel produced. At the same time, if collection is not considered, the fact that this control means limits combustion provides advantages of safety and economy through lower heat load and gas flow rates prevailing in the early stages of the blow and thereby resultant decrease in power consumption per ton of steel for gas cooling and cleaning.

Once the hood skirt is lowered to provide the required pre-set negative pressure at the initially fixed venturi throat low gas flow position, as gas flows from the process increase, the movements of the variable venturi throat are used for finer operational corrections to maintain the pre-set negative pressure at levels in the range of $-3$ to $-8$ mm W.G. The signals controlling the movement of the venturi throat are based on hood pressure supervised by gas analysis system signals in relation to the desired pre-set calorific value required. Such controls have the advantage of providing system sensitivity that will avoid pulsations of evolved gases through the air gap to the atmosphere which causes air pollution and simultaneously provides a combustible gas of desired calorific value. In cases where major fluctuations in flow rate occur, the hood skirt system will become operable together with the venturi throat control to make the system self-adapting and highly responsive to major changes.

Additionally, the calorific value measurements from the infra-red sensor are monitored and used for automatic and/or manual switching of off-gases for collection and storage when a pre-set value for collection is reached.

When the blow progresses towards its end-point, the combined concentration of CO and $H_2$ decreases, calorific value drops and on reaching the pre-determined limiting value as monitored by the infra-red sensor, causes automatic switching to the waste gas stack.

When the blow is near the end-point, the combined concentrations of CO and $H_2$ decrease and those of $CO_2 + H_2O$ increase. The rate of gas flow at this time is controlled by the variable venturi throat. As air is aspirated through the air gap and once again conditions for stoichiometric combustion occur, this condition is sensed by the oxygen partial pressure sensor which initiates the signal for hood opening by movement of the hood skirt.

The above described control system again becomes operative towards the end of the blow, permitting automatic opening of the hood late in the blow which provides for safety and economy as attributed to the early stages of the blow.

In case of high carbon heats, turn down is done at a period in the blow when high concentration of $CO + H_2$ exist and opening of the hood could result in explosive conditions due to air aspirated from the atmosphere. On such heats injection of nitrogen into the hood for dilution and inertization is done. This nitrogen injection is automatically initiated through mechanical coupling with the vessel tilt drive. As required the same control system will be used to raise and lower the vessel on nitrogen to minimize fume generation.

Additionally, the same nitrogen infection for safety inertization will be triggered by signals from the partial oxygen pressure sensor used to monitor and detect approach of potential explosive conditions in the gas collection and cleaning system.

Additional pollution control devices are provided that become operational during vessel turn-down and during charging and tapping operations such as when the vessel is partially or fully noncoincident with the main collection hood. These devices will be comprised of auxiliary hoods around or on either side of the main hood. Such a hood assembly will be connected through a duct to the inlet of the secondary variable throat venturi scrubber. A motor operated shut-off valve will be provided in this duct. As the vessel is turned down from a vertical to a horizontal position a position indicator signals the progressive opening of the shut-off valve in the auxiliary duct and simultaneous and progressive closure of the primary venturi throat to a final pre-set minimum opening. This transfers the suction of the exhaust fan from the main hood to the auxiliary hood. Fumes drawn off in the auxiliary hood are cleaned through the secondary venturi and exhausted to the atmosphere through the system stack. Fumes drawn through the main hood are cleaned through both the primary and secondary venturi scrubbers.

An illustration of the invention will now be described in reference to the drawings.

DESCRIPTION OF A PREFERRED EMBODIMENT

Figure 1:
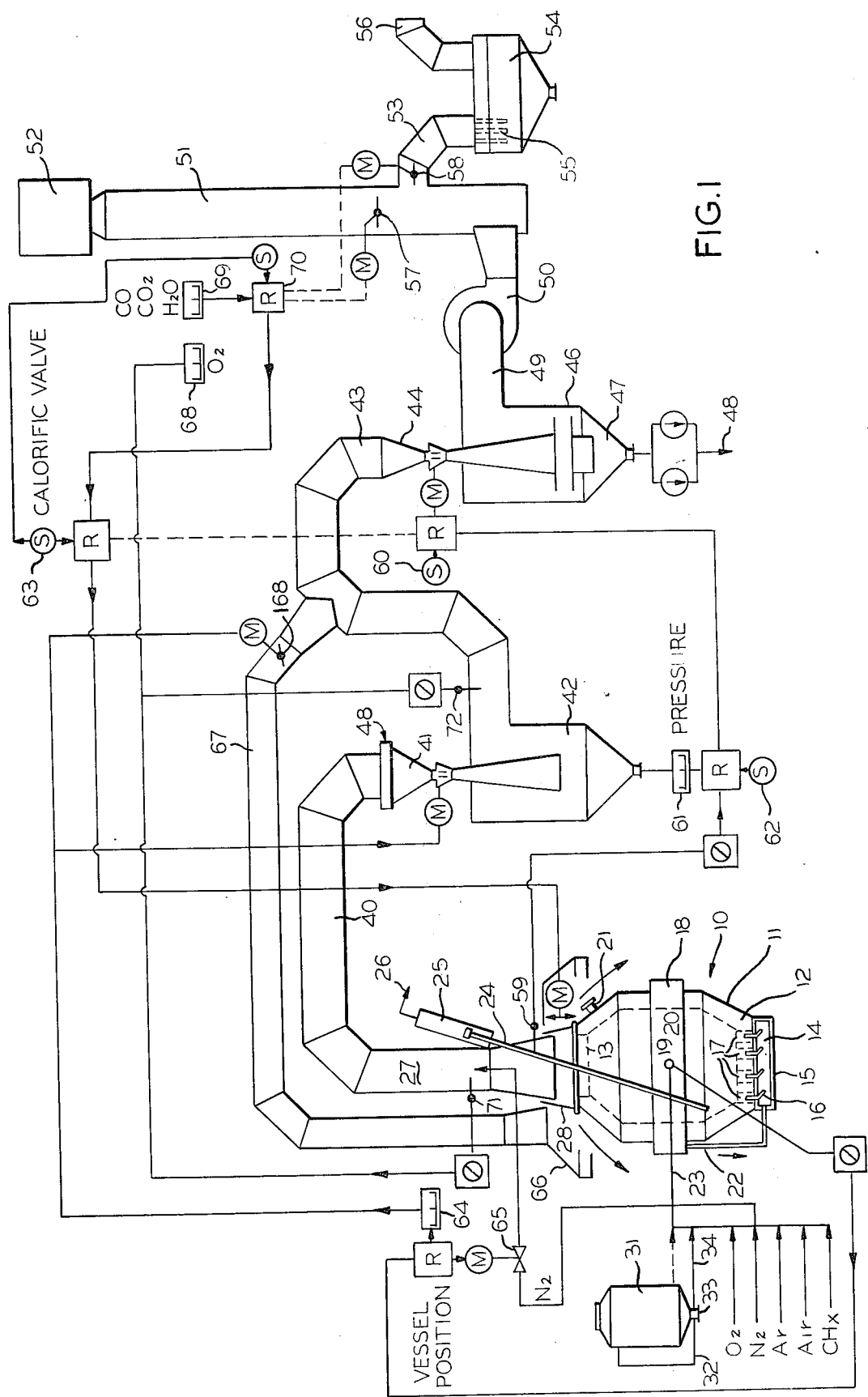
FIG. 1 is a schematic diagram of a bottom-blown steel converter system and associated gas handling equipment.

In FIG. 1 the bottom-blown converter vessel is generally designated by the reference 10. This commprises a metal shell 11 lined with refractory 12 except for its top mouth 13. At the bottom of the vessel is a housing 14 in which there is a gas and powdered material distributor box 15. These substances are injected under pressure into the molten metal within vessel 10 by means of several nozzles 16 which extend into tuyeres 17 in the bottom of the vessel. All gases and powdered solid materials which are injected in the melt diffuse upwardly through it. Intimate and extensive contact between active gases such as oxygen and the powdered flux materials results in practically stoichiometric reactions. Inert gases, of course, diffuse through the melt and arrive at the interior top of the vessel.

The vessel 10 is shown mounted conventionally on a tiltable trunnion ring 18 which has laterally extending trunnion shafts 19 and 20 that are normally journaled in supports which are not shown. Thus, the vessel 10 may be inverted on trunnion shafts 19 and 20 to discharge slag or it may be tilted substantially horizontally to discharge the molten metal through a tapping side spout 21.

Selected gases, liquids and powdered solids are delivered for injection to distributor chamber 15 at the bottom of vessel 10 through a pipe 22 that is connected to trunnion shaft 19 which is hollow. A feed pipe 23 connects to hollow trunnion shaft 19 by means of a swivel joint which is not shown. Thus, gases and materials may be injected when vessel 10 is upright and gases only may be injected when the vessel is tilted.

A thermocouple probe 24 for sensing temperature at the top center of the melt projects through vessel 10 at an angle from a reversibly moveable thermocouple support 25. The lead conductors from the thermocouple are symbolized by a line marked 26.

Above the top of the mouth of vessel 10 is a water-cooled hood 27. The hood 27 is provided with a moveable skirt 28 which can be elevated and lowered with respect to vessel 10 so as to allow an annular gap between the vessel mouth and the hood skirt for reasons which will be explained later.

Typical gases which may be injected in the bottom of vessel 10 are designated $O_2$, $N_2$, Ar (Argon), air and $CH_x$ for a hydrocarbon gas or vapor. The sources for the gases are shown connected into main feed pipe 23. Hydrocarbon fluid is always injected around the oxygen stream through tuyeres in the bottom of vessel 10. The hydrocarbon prevents premature deterioration of the bottom lining.

A typical pressurized container for storing powdered material that is to be injected into the bottom of the melt within the vessel 10 is marked with the numeral 31. In an actual installation there are several such containers for storing such powdered flux materials as lime, limestone and flurospar as well as iron oxide, a desulphurizing agent and other additives. Oxygen is usually used to entrain and convey the powdered materials at a controlled rate. Nitrogen and other gases are used as required as well. An oxygen pipe 32 feeds into vessel 31 and a mixing device 33 from which the oxygen and the powdered material is delivered through a pipe 34 to main feed pipe 23 and ultimately to vessel 10.

The water-cooled hood 27 over vessel 10 is connected with a water-cooled hood stack 40 leading to a saturator-venturi 41 in which the evolved gases are quenched and cooled to saturation temperature at the prevailing pressure. Water is drained from a separator 42. The gases are then conducted through a pipe 43 to a second venturi scrubber 44 for final cleaning which is subject to variable flow control. The gas then goes to a droplet separator 46. The water is drained to a sump 47 and recycled to the overflow trough 48 at the inlet of saturator-venturi 41. The gas then flows through a pipe 49 to an exhaust fan 50 from where it is delivered to a stack 51 and burnt at a torch 52.

In case of gas recovery stack 51 is connected to a pipe 53 which leads to a water seal check valve 54 in which there are a plurality of pipes 55 whose ends are immersed in water so that gas cannot back up into the system. The gas which comes through pipe 53 and trap 54 in that case is the high calorific value gas comprised largely of CO and $H_2$ and some $CO_2$, $H_2O$ and $N_2$. The useful gas is conducted away through a pipe 56 to a pump and storage pressure vessel, the last two items not being shown.

Stack 51 has a damper or valve 57. The damper is controlled so that the inert gas plug, of the low calorific gas, may be selectively discharged to the atmosphere through the stack rather than pipe 53 for storage. Pipe 53 also has a damper 58 which is opened to pass the high calorific gas when such is being evolved from the vessel 10. When damper 57 is closed, damper 58 is opened and vice versa. Switching of these valves is controlled on the basis of a pre-set calorific valve related to the actual readings from the combined outputs of the partial pressure sensor 68 and infra-red sensor 69.

The point of gas sampling for $PO_2$ (oxygen partial pressure) analyzer 68 and infra-red analyzer 69 (CO, $CO_2$, $H_2O$) will be either at the hood at point 71 or after the venturi scrubber 41 at point 72. Pressure sensor and its location is designated by numeral 59. Signals from the pressure sensor 59 converted to electric signals is used to control the motor that operates movements of the variable throat of secondary venturi 44.

During start of a blow the throat opening of secondary venturi scrubber 44 is pre-set by a set value indicator 60. As the CO + $H_2$ level increases and combustion takes place with aspirated air through the air gap between the hood and vessel mouth with hood skirt 28 in a raised position, the $PO_2$ analyzer 68 monitors changes in combustion conditions. When the actual point of stoichiometric combustion is reached and the presence of an inert gas plug is identified by the pronounced signals from the $PO_2$ analyzer 68, this signal is used to initiate closure of hood skirt 28. Closure of hood skirt 28 is continued through signals from the $PO_2$ analyzer 68 till such time that the pressure in the hood as measured by sensor 59 and indicated on pressure indicator 61, is equal to a pre-set negative pressure on a set value indicator 62. At this position of hood skirt 28, control of the negative pressure in the collection and cleaning system is then taken over by the variable throat of the secondary venturi 44.

The pressure signal from sensor 59 to the variable throat of secondary venturi scrubber 44 is supervised by signals from the $PO_2$ analyzer 68 and infra-red analyzer 69 giving the calorific value of the gas to maintain a pre-set calorific value set in set value indicator 63.

When the pre-set calorific value of the gases is reached, as set on set value indicator 63, the controller 70 initiates switching of valves 57 and 58 from gas exhaust to gas collection.

In the case of high carbon heats and for emergency turn down of vessel 10 at levels when high CO + $H_2$ exist, as the vessel is turned down, this condition is monitored by vessel position indicator 64 which will open nitrogen injection valve 65. Such opening will provide for a nitrogen purge for inertization of the gases in the system. Simultaneously the decreasing calorific value of the gases monitored by instruments 68 and 69 and compared with set value indicator 63, will cause controller 70 to switch valves 57 and 58 such that gases are exhausted through stack 51.

Additionally, the nitrogen injection valve 65 will be triggered by signals from the $PO_2$ analyzer 68 and infra-red analyzer 69 indicating the approach of a potential explosive emergency condition through the identified presence of oxygen with a high calorific value gas containing high CO + $H_2$ levels.

Fumes emitted during any tilting operation or during charging and tapping are collected jointly through the main hood 27 and the auxiliary hood 66 which is connected through a duct 67 via a shut off valve 168 to the inlet duct 43 of the secondary venturi scrubber 44. As the vessel 10 is tilted from the vertical, the vessel position indicator 64 causes progressive opening of shut-off valve 168 in the auxiliary hood duct 67, and the progressive closure of primary venturi scrubber throat 41 to a minimum pre-set opening accomplished through limit switches. Fumes from the auxiliary hood are thus cleaned through the secondary venturi scrubber 44 while those collected through the main hood 27 are cleaned through both venturi scrubbers 41 and 44, utilizing the main gas cleaning exhaust fan 50.

Figure 2A:
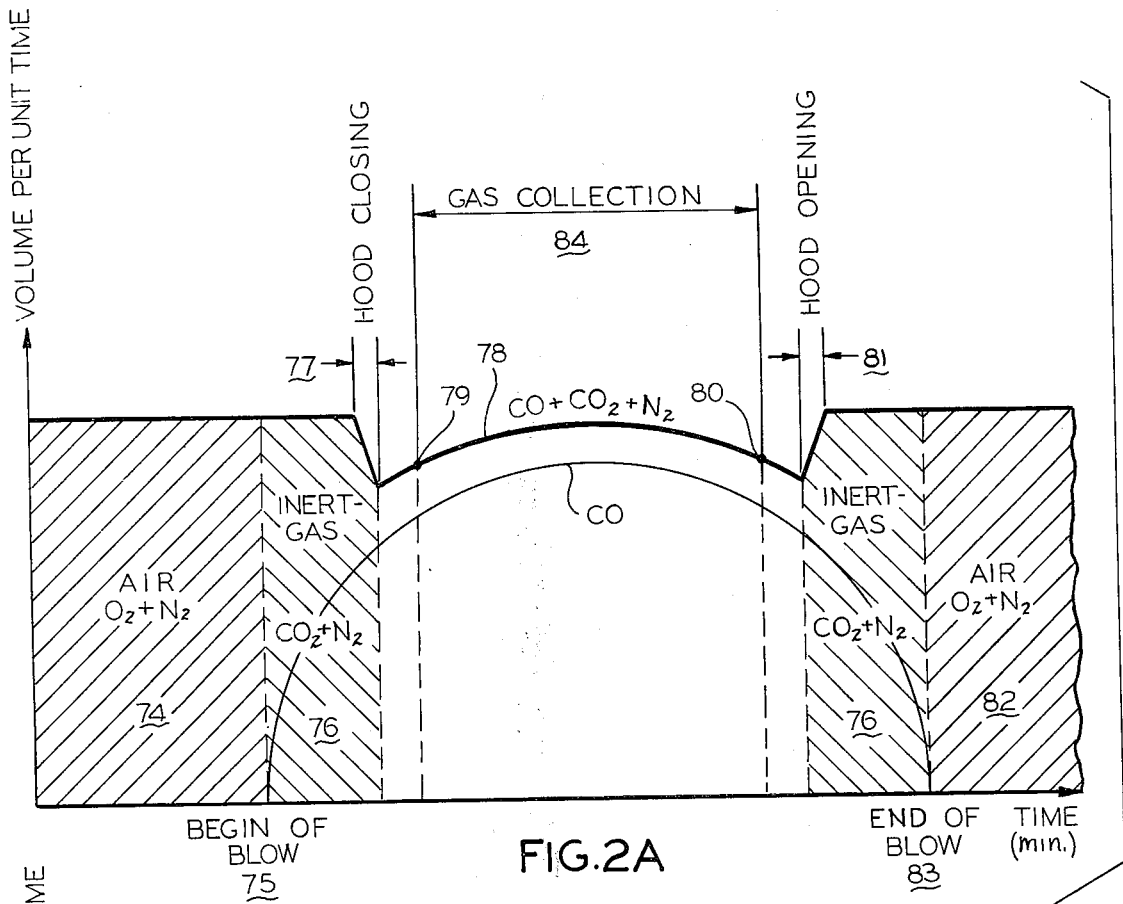
FIG. 2 is a graph of the primary and partially combusted off-gas volumes and gas collection volumes with respect to time.
Figure 2B:
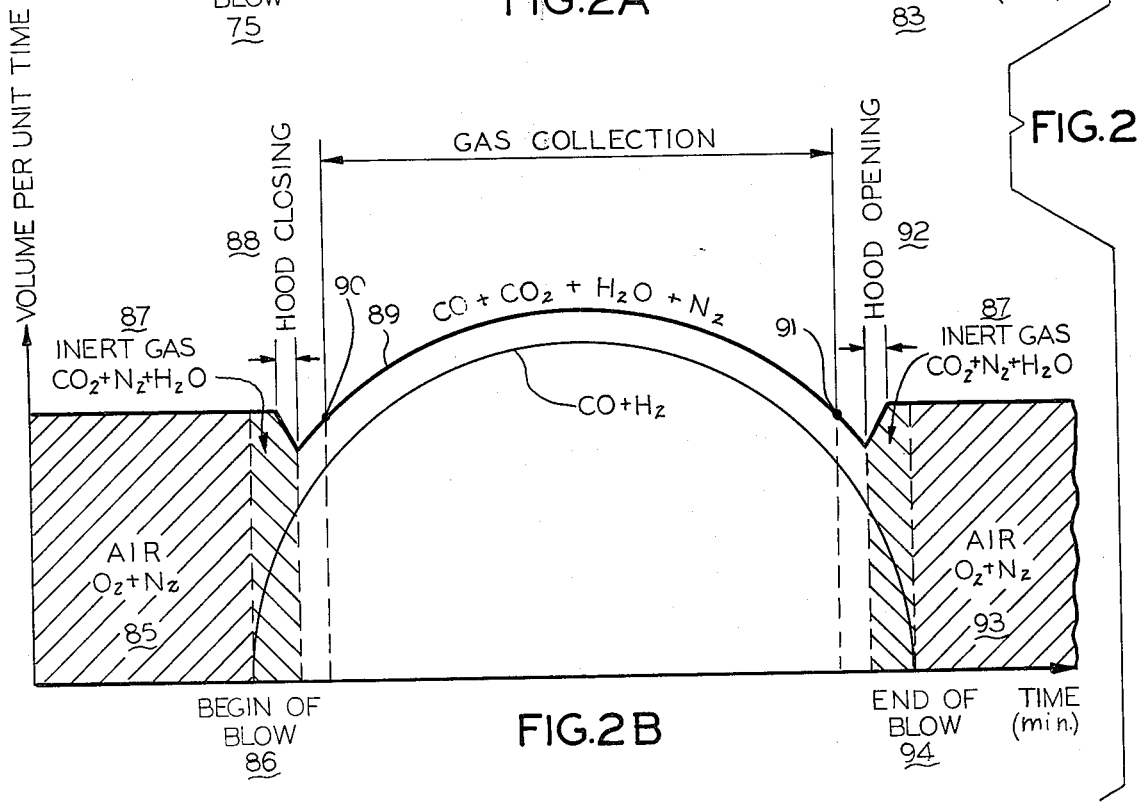

FIG. 2 illustrates the status of primary and partially combusted off-gas volumes and gas collection volumes with respect to time relative to this invention and prior art existing with other oxygen steelmaking processes. The status with respect to prior art using the top-blown oxygen steelmaking process is shown in Sketch A. Sketch A diagramatically represents the process sequence which begins with air from atmosphere purging through the system before commencement of a blow. This air serves as combustion air when a blow is initiated and forms an inert gas plug the duration of which is defined by the amount of air volume sucked into the system. For safety reasons and reasons of instrument response delay, the closure of the hood is delayed in this conventional approach and is based on a conventional oxygen analyzer providing values on actual oxygen in the gas. When oxygen levels are considered safe the hood skirt is manually closed 77 and a gas rich in CO with small amounts of nitrogen and carbon dioxide is produced as represented by curve 78. Collection of gas begins at a pre-set calorific value represented by point 79. Collection can be maintained throughout the blow till the dropping CO level produces a gas which reaches the limiting set calorific value again, and the collection is discontinued as represented by point 80. In a safe period before the end of blow the hood skirt is opened 81, allowing for full combustion of the further decreasing CO volume, thus forming an inert gas plug to purge the system before air 82 can be admitted after end of blow 83. This long inert gas plug formation period at the beginning and end results in a relatively short collection period 84 as compared to the invention described earlier and hereinafter.

The advantages of the system invented with its inherent controls are diagramatically represented in Sketch B of FIG. 2. The use of an oxygen partial pressure analyzer $PO_2$ represented earlier in FIG. 1 as numeral 68 provides a means to very distinctly measure the stoichiometric combustion point, that makes possible the rapid identification of the absence of oxygen which means the formation of an inert gas plug. The high reliability of this sensor makes it possible to operate the gas cleaning system before the beginning of the blow 86 with a smaller air volume 85. This air serves as combustion air to form the required inert gas plug 87 as discussed earlier, but the duration and total volume is significantly reduced due to the high response sensors used as described above. It further permits automatic control of the hood skirt closure 88 which is major advantage over existing practices. The gas produced is rich in CO with $H_2$ and small amounts of $H_2O$, $CO_2$ and nitrogen as represented by curve 89. Safe collection of gas commences at a pre-set calorific value represented by point 90. Collection is maintained throughout the blow and discontinued at point 91 when the limiting pre-set calorific value of off-gas is reached. The use of an infra-red sensor in series with the oxygen partial pressure analyzer provides a means for quick response to these limiting values.

The safe period for hood skirt opening 92 is again very positively identified as indicated for start of blow due to sensor 68 (FIG. 1) establishing again the presence of an inert gas plug 87. Air 93 can thus be safely admitted after end of blow 94.

We claim:

1. For use in a system for air pollution control and safe gas recovery and control of hot off-gases from a bottom blown oxygen steelmaking converter vessel utilizing injection of hydro-carbon fluid, as means to prevent bottom refractory deterioration along with process oxygen and other inert gases together with entrained finely divided materials beneath the surface of molten metal for converting ferrous metal to steel, the improvement comprising:
   a. said bottom blown oxygen vessel having a mouth opening and a water-cooled hood means with an inside diameter essentially equal to the vessel mouth opening,
   b. said water-cooled hood means having a movable skirt means advanceable and retractable to adjust and vary an air gap between said hood means and vessel mouth opening,
   c. said water-cooled hood means being connected through a water-cooled stack means to a water-cooled duct means connected to a first venturi-scrubber for quenching hot gases and initial pre-cleaning,
   d. said first venturi-scrubber being connected through ducting to a secondary wet venturi-scrubber for final cleaning,
   e. said second venturi-scrubber means being provided with a fixed whirl vane separator for removing entrapped water particles from the gas stream, said gas stream being made to change direction and discharge tangentially to a duct leading to an exhaust fan,
   f. said exhaust fan having an operating characteristic that provides an essentially constant pressure over a wide range of gas flow rates and a pressure outlet for discharging clean waste gases into a stack,
   g. said waste gas stack having two outlets, a shut-off valve in each of said outlets, one of said stack outlets being provided with a torch to burn cleaned waste gases for discharge to the atmosphere, the other of said stack outlets being adapted for connection to a storage reservoir for gas storage.

2. The apparatus set forth in claim 1 wherein:
   a. motive means is provided for raising and lowering said skirt in response to signals from a partial oxygen pressure sensor for assuring safe closure of the hood based on indication of stoichiometric combustion point of formation of an inert plug,
   b. said first venturi-scrubber being equipped with a variable throat operated by a motor, said throat being constructed and arranged to close down from a full open position to a pre-set minimum opening established through the use of conventional limit switches,
   c. said second venturi-scrubber being equipped with a motor operated variable throat, said throat being constructed and arranged to open to a pre-set minimum value based on signals from a set point indicator, and additionally provided for operation to control flow rate on the basis of hood pressure control and signals from a gas analysis system.

3. The apparatus set forth in claim 2 including:
   a. control means for controlling the position of said moveable hood skirt with respect to vessel mouth firstly at a period in the heat cycle when an inert gas plug has formed and purged the gas cleaning system of combustion air to ensure safe passage of combustible gas through said gas cleaning system, and for establishing an air gap size that provides a negative pressure equal to a pre-set value set into a pressure set value indicator,
   b. said control means being operable in response to control signals from a oxygen partial pressure sensor which indicates that a stoichiometric combustion point has been reached and that an inert gas plug has been formed; and a pressure sensor coupled to the hood for producing a signal to stop hood skirt downward movement based on arrival of a null point equating a pre-set negative pressure reading with an actual pressure drop value in the hood measured by said pressure sensor.

4. The apparatus set forth in claim 2 including:
   a. control means effective for opening and closing of the variable throat of the said secondary venturi scrubber, such that the throat opening will vary as a function of the gas evolved from the bath of said bottom blown oxygen converter process vessel, b. said control means including pressure measuring means for measuring the pressure in the substantially closed hood and for producing an electrical signal, regulator means coupled to receive said signal for comparing said signal to a pre-set negative pressure value, said regulator means being responsive to said comparison for actuating the first venturi throat operating motor, c. an infra-red sensor associated with said oxygen partial pressure sensor means for measuring the $CO$, $CO_2$ and $H_2O$, exhausting from said vessel such that in combination a direct measurement of gas calorific value is obtained and used to supervise the pre-set pressure value in the pressure control system in relation with a pre-set required gas calorific value for collection, d. the said pressure control supervision means being obtained by varying the manually pre-set negative pressure set value in the range minus 1 mm to minus 10 mm water column.

5. The invention set forth in claim 4 wherein:
a. The adjustment of the system to obtain the range of said negative pressure set values being achieved through independent movements of either the said hood skirt or said variable venturi throat, or through a combination of both.

6. The invention set forth in claim 4 wherein:
a. the said calorific value measurement signal from a combination of said oxygen partial pressure sensor and said infra-red sensor being for controlling the switching of off-gas from exhaust to collection in reference with a desired calorific value pre-set into a set value indicator, b. said oxygen partial pressure sensor being coupled to sample said gas at one of said water-cooled hood on the raw gas side adjacent said converter mouth opening and subsequent to the first venturi scrubber on the precleaned gas side.

7. The apparatus set forth in claim 1 wherein:
a. said vessel including a position indicator to indicate degree of tilt of said vessel from vertical, a nitrogen injection valve means coupled to a source of nitrogen gas and one of said vessel bottom tuyeres and hood means, the said position indicator being electro-mechanically coupled to operate the nitrogen injection valve means for injection of inertization nitrogen into the said one of said vessel bottom tuyeres and, b. gas analysis means coupled to measure the calorific value of said off gases and for providing a signal in response thereto, c. said nitrogen injection valve means being controlled by said signal from the gas analysis means such that a direct calorific value reading will trigger injection of nitrogen in the hood for inertization where the bottom blown vessel is turned down, c. said nitrogen injection valve means being operable during the operation of a blow when the presence of oxygen in the system is signaled by the gas analysis means simultaneously at a pre-set figure for gas calorific value.

8. The apparatus set forth in claim 1 including:
a. An auxiliary hood means located on one of the charging or tapping sides of the bottom blown oxygen converter vessel to collect fumes during such periods when the vessel is tilted from a vertical position and is nonconicident with the water-cooled hood means, b. said auxiliary hood means being connected through a duct means to the inlet of the said secondary venturi scrubber means, c. said duct means being provided with a shut-off valve to progressively switch from a fully closed to a fully open position as the vessel means is tilted.

9. The invention set forth in claim 8 wherein:
said vessel position indicator means is coupled to said shut-off valve to said first venturi throat means for progressively and simultaneously close the said first venturi throat means up to a preset minimum opening and to open said auxiliary hood system shut-off valve means.

10. The invention set forth in claim 9 wherein:
a. the main gas cleaning system includng said water-cooled hood means, venturi scrubber means, and exhaust fan are used along with said auxiliary hood means to collect and clean fumes when said vessel is tilted from a vertical blowing position, b. said fumes collected in the auxiliary hood means being cleaned in the said second venturi scrubber means, and the fumes collected in the water-cooled hood means being cleaned both in the first and second venturi scrubber means.

11. A system for collecting off-gases from a bottom-blown vessel in which molten ferrous metal is converted to steel, said vessel having a mouth through which the gases exit from the vessel, comprising:
a. gas collection hood means situated over the mouth of the vessel at the beginning of a gas flow path and including skirt means that are advanceable and retractable to permit varying the gap between the vessel mouth and the hood means, b. first venturi-scrubber means having an inlet and an outlet, and first duct means connecting said inlet to said hood means, said first venturi-scrubber means including means for regulating gas flow therethrough, c. second venturi-scrubber means having an inlet and an outlet, and second duct means connecting said inlet to said outlet of said first scrubber means, said second scrubber means including means for regulating gas flow therethrough selectively whereby to permit regulation of the gas pressure in said hood means, d. exhaust fan means having an inlet connected to said second scrubber means outlet and also having an outlet, said exhaust fan being characterized by producing a substantially constant pressure on its inlet side for a wide range of gas flow rates, e. partial pressure sensor means disposed in the gas flow path, said partial pressure sensor means producing signals which are functionally related to combustibility of said gases, f. means operatively coupled with said skirt means for positioning it to create a desired gap between the skirt means and the vessel mouth, said operatively coupled means being controlled on at least one occasion by said signals, g. said operatively coupled means responding to a purging inert gas plug being formed, as indicated by said sensor means sensing that substantially stoichiometric combustion of the gases has occured, by advancing said skirt means to reduce the gap between the skirt means and the vessel mouth whereupon air flow through said gap and gas flow through the system in under control of said gas flow regulating means.

12. The system set forth in claim 11 wherein:
a. said sensor means is responsive to the partial pressure of oxygen in said gases.

13. The system set forth in claim 11 including:
a. second sensor means disposed in the gas flow path, said second sensor means producing signals which are functionally related to the content of gases selected from the class of CO, $CO_2$, and $H_2O$ and combinations thereof,
b. control means responsive to said last named signals and coordinately controlling said gas flow regulator means to maintain negative pressure in said hood means when said skirt means is advanced to reduce the gap with said vessel.

14. The invention set forth in claim 13 wherein:
a. said second sensor means is an infrared type sensor.

15. The system set forth in claim 11 including:
a. means for presetting a set point for a first predetermined preferably negative pressure that is to be effected by said second venturi-scrubber means, and first control means controlling the flow regulating means of said second scrubber means,
b. pressure sensor means sensing pressure in said hood means at least when said skirt means has reduced said gap, said pressure sensor means producing control signals to which said control means responds by maintaining the desired negative pressure in said hood means to provide finer operational gas flow corrections when said hood means gap is reduced.

16. The system set forth in claim 15 including:
a. means for presetting a second set point pressure, which when attained in said hood means effects interruption of the advance of said skirt means toward said vessel, said aforesaid pressure sensor means in said hood means producing a signal which is functionally related to the actual pressure in said hood means, and
b. means for comparing said last named produced signal and said second set point pressure to thereby produce a signal for controlling the aforesaid first control means to thereafter regulate the pressure in said hood means.

17. The system set forth in claim 15 wherein:
a. the value of said preset first set point is adjusted to maintain the negative pressure in said hood means in the range of 1 millimeter to 10 millimeters in terms of a water column.

18. The system set forth in claim 11 including:
a. second sensor means disposed in the gas flow path from said vessel, and producing signals which are functionally related to the content of gases selected from the class of CO, $CO_2$, and $H_2O$ and combinations thereof,
b. individual valve means selectively operable to direct said gases alternatively to an exhaust path or a collection path,
c. valve control means operatively associated with said valve means,
d. means for presetting the values of at least the CO and $CO_2$ which shall exist when said valve means are operated to collect said gases,
e. means comparing the signals corresponding to gas analysis made by said second sensor means with the values of said last named presetting means, the said control means responding to said comparison by selectively operating said valve means whereby to determine the portion of the total gases which are collected.

19. The system set forth in claim 11 including:
a valve means adapted to receive inert gas under pressure and including means associated with said valve means for injecting inert gas into the gas flow path to inertize the gases therein,
b. signal operative control means operatively coupled with said last named valve means to open and close the same for selective inert gas injection.

20. The system set forth in claim 19 wherein:
a. said signal operated control means is operated in response to signals from the aforesaid partial pressure sensor means,
b. the said partial pressure sensor means is adapted to sense the partial pressure of oxygen when said vessel is being bottom-blown, signals corresponding with approach of enough oxygen to cause combustion causing said control means to operate said valve means for inert gas injection.

21. The system set forth in claim 20 including:
a. second sensor means disposed in the gas flow path from said vessel and producing signals which are functionally related to the content of gases selected from the class of CO, $CO_2$ and $H_2O$ and combinations thereof, said last named signals varying in accordance with the calorific value of said gases,
b. said signal operative control means receiving said last named signals concurrently with said oxygen corresponding signals whereby to operate said valve means open to thereby inject inert gas if said signals correspond with oxygen and the calorific value departing from preset values.

22. The system set forth in claim 11 including:
a. an auxiliary hood means adjacent said aforementioned hood means and adapted to collect emissions from the vessel when the latter is not aligned with said aforementioned hood means,
b. duct means connecting said auxiliary hood means to the inlet side of said second venturi-scrubber means and valve means in the last named duct means,
c. drive means operatively coupled with said last named valve means,
d. means responsive to the position of said vessel and controlling said drive means in correspondence with said position to thereby operate said last named valve means for progressively diverting gases from said hood means through said auxiliary hood means to said second venturi-scrubber as said vessel tilts out of alignment with the aforementioned hood means.

23. The system set forth in claim 22 including:
a. operating means coupled with the said first venturi-scrubber gas flow regulating means,
b. said means responsive to the position of said vessel controlling said operating means to thereby adjust said regulating means and the gas flow through said first venturi-scrubber means concurrently with operation of said last named valve means.

24. A system for collecting off-gases from a pneumatic metallurgical converter vessel, said vessel having a mouth through which the gases exit from the vessel, comprising:

gas collection hood means situated over the mouth of the vessel and including skirt means advanceable and retractable to permit varying the gap between the vessel mouth and the hood means, first and second interconnected gas cleaning means connected to said hood means and including gas flow regulating means, exhaust means having an outlet and an inlet connected to said second gas cleaning means, said hood means, said gas cleaning means and said exhaust means defining a gas flow path, gas composition sensing means coupled to said gas flow path, said sensing means being operative to produce signals which are functionally related to combustibility of said gases, skirt positioning means operatively coupled to said skirt means for positioning the same to create a desired gap between the skirt means and the vessel mouth, said skirt positioning means being at least partially controlled by said signals, said gas composition sensing means being operative to produce a predetermined signal in response to a purging inert gas plug being formed indicating that substantially stoichiometric combustion of the gases has occurred, said skirt positioning means being operative in response to said predetermined signal to advance said skirt means to reduce the gap between the skirt means and the vessel mouth whereupon air flow through said gap and gas flow through the system is under control of said gas flow regulating means.

25. The system set forth in claim 24 wherein said gas composition sensing means is responsive to the partial pressure of oxygen in said gases.

26. The system set forth in claim 24 and including second sensor means disposed in the gas flow path, said second sensor means producing signals which are functionally related to the content of gases selected from the class of CO, $CO_2$, and $H_2O$ and combinations thereof, and control means responsive to said last named signals and coordinately controlling said gas flow regulator means to maintain negative pressure in said hood means when said skirt means is advanced to reduce the gap with said vessel.

27. The system set forth in claim 24 including means for presetting a set point for a first predetermined preferably negative pressure that is to be effected by said gas flow regulating means, and first control means for controlling said gas flow regulating means, and pressure sensor means coupled to said hood means and to said first control means for sensing pressure in said hood means when said skirt means has reduced said gap, said pressure sensor means producing control signals to which said first control means responds by maintaining the desired negative pressure in said hood means to provide finer operational gas flow corrections when said hood means gap is reduced.

28. The system set forth in claim 24 including means for presetting a second set point pressure, which when attained in said hood means effects interruption of the advance of said skirt means toward said vessel, said aforesaid pressure sensor means producing a signal which is functionally related to the actual pressure in said hood means, and means for comparing said last named produced signal and said second set point pressure to thereby produce a signal for controlling the aforesaid first control means to thereafter regulate the pressure in said hood means.

29. The system set forth in claim 27 wherein the value of said preset first set point is adjusted to maintain the negative pressure in said hood means in the range of 1 millimeter to 10 millimeters in terms of a water column.

30. The system set forth in claim 24 including valve means adapted to receive inert gas under pressure and including means associated with said valve means for injecting inert gas into the gas flow path to inertize the gases therein, signal operative control means operatively coupled with said valve means to open and close the same for selective inert gas injection.

31. The system set forth in claim 30 wherein said signal operated control means is operated in response to signals from the aforesaid partial pressure sensor means, the said gas composition sensing means is adapted to sense the partial pressure of oxygen when said vessel is being bottom-blown and for producing signals functionally related thereto, signals corresponding with approach of enough oxygen to cause combustion causing said control means to operate said valve means for inert gas injection.

32. The system set forth in claim 31 including second sensor means disposed in the gas flow path from said vessel and producing signals which are functionally related to the content of gases selected from the class of CO, $CO_2$ and $H_2O$ and combinations thereof, said last named signals varying in accordance with the calorific value of said gases, said signal operative control means receiving said last named signals concurrently with said oxygen related signals whereby to operate said valve means open to thereby inject inert gas if said signals correspond with oxygen and the calorific value departing from preset values.

33. The system set forth in claim 24 including an auxiliary hood means adjacent said gas collection hood means and adapted to collect emissions from the vessel when the latter in not aligned with said gas collection hood means, said gas cleaning means including series connected first and second gas cleaning sections each having an inlet and an outlet, duct means connecting said auxiliary hood means to the inlet side of said second gas cleaning section and valve means in the last named duct means, drive means operatively coupled with said last named valve means, means responsive to the position of said vessel and controlling said drive means in correspondence with said position to thereby operate said last named valve means for progressively diverting gases from said gas collection hood means through said auxiliary hood means to the inlet of said second gas cleaning section as said vessel tilts out of alignment with the gas collection hood means.

34. The system set forth in claim 33 wherein operating means is coupled with the said gas cleaning section gas flow regulating means, said means responsive to the position of said vessel controlling said operating means to thereby adjust said gas regulating means and the gas flow through said first venturi-scrubber means concurrently with operation of said last named valve means.

35. The system set forth in claim 24 wherein one of said gas cleaning means includes wet scrubber means having an inlet connected to said hood means and an outlet connected to said exhaust means, said wet scrubber means including means for selectively regulating gas flow therethrough to permit regulation of gas pressure in said hood means, said exhaust means being constructed and arranged to provide a substantially constant pressure at its inlet for a wide range of gas flow rates.

36. The system set forth in claim 35 wherein said first and second gas cleaning includes first and second wet scrubber means connected in series and each including gas flow regulating means.

37. In combination, a metallurgical converter vessel having an opening and means for injecting process gases into molten metal containable therein, means for tilting said vessel from a first process gas blowing position to alternate positions for receiving and discharging metal, gas collection hood means disposed above the opening in said vessel when the latter is in its first position and including skirt means advanceable and retractable to permit varying the gap between the vessel opening and the hood means, first gas cleaning means, means having an inlet connected to said hood means and an outlet, said first gas cleaning means including wet scrubber means and gas flow control means for regulating the gas flow therethrough, second gas cleaning means including an inlet connected to the outlet of said first gas cleaning means and an outlet, exhaust means connected to the outlet of said second gas cleaning means, an auxiliary hood means adjacent said gas collecting hood means and adapted to collect emissions from the vessel when the latter is tilted to an alternate position, duct means connecting said auxiliary hood means to the inlet of said second cleaning means and valve means connected in said duct means, valve operator means for operating said valve means to connect said auxiliary hood means to said second gas cleaning means when said vessel is tilted to its alternate position and for closing said valve means to prevent the inflow of air when said vessel is in its first position.

38. The system set forth in claim 37 and including operating means coupled to said valve means and to the gas flow control means for controlling the gas flow through said first gas flow control means concurrently with operation of said valve means.

39. The system set forth in claim 38 wherein said valve operator means includes drive means operatively coupled to said valve means, vessel position responsive means coupled to said drive means for controlling said drive means in correspondence with said position to thereby place said valve means in an open position when said vessel is in an alternate position and to place said valve means in a closed position when said vessel is in its first position for diverting gases from said gas collecting hood means through said auxiliary hood means to said second gas cleaning means when said vessel is tilted out of alignment with the gas collection hood means, said operating means also being connected to said vessel position responsive means for controlling said gas flow control means in relation to the position of said vessel.

40. The system set forth in claim 39 wherein said vessel position responsive means is operative to progressively open said valve means and reduce the flow through said first gas cleaning means as said vessel is tilted toward an alternate position.

41. The system set forth in claim 40 wherein said first and second gas cleaning means includes venturi-scrubbers.

42. A system for collecting off-gases from a pneumatic metallurgical converter vessel, said vessel having an opening through which the gases exit from the vessel, gas collection hood means situated over the opening of the vessel and including skirt means advanceable and retractable to permit varying the gap between the vessel opening and the hood means, means for tilting said vessel between a first position wherein said hood is disposed above said opening and a second position wherein said vessel is oriented with said opening displaced from alignment with said hood, first venturi-scrubber means having an inlet connected to said hood and an outlet, said first venturi-scrubber means including means for regulating gas flow therethrough.

second venturi-scrubber means having an inlet connected to the outlet of said first venturi-scrubber and an outlet, said second scrubber means including means for regulating gas flow therethrough selectively whereby to permit regulation of the gas pressure in said hood means, exhaust means having an inlet connected to the outlet of said second venturi-scrubber means and being constructed and arranged to produce substantially constant pressure on its inlet side for a wide range of gas flow rates, said hood means, said first and second venturi-scrubber means and said exhaust means defining a gas flow path, gas composition sensing means coupled to said gas flow path, said sensing means being operable to produce signals which are functionally related to combustibility of said gases, skirt positioning means operatively coupled to said skirt means for adjusting the gap between the skirt means and the vessel opening, said skirt positioning means being operative for initially positioning said skirt above the opening in said vessel to draw air into said hood for oxidation of combustible gases and for lowering said hood to reduce the inflow of air to said hood when said gas composition sensing means indicates that stoichiometric conditions have been reached in said gas flow path.

43. The system set forth in claim 42 wherein said gas composition sensing means comprises partial pressure measuring means.

44. The system set forth in claim 43 and including an auxiliary hood means adjacent said gas collecting hood means and adapted to collect emission from the vessel when the latter it tilted to its second position, duct means connecting the alternate hood means to the inlet of said second gas cleaning means to the inlet of said second venturi scrubber means and valve means connected in said duct means, valve operator means for operating said valve means to connect said auxiliary hood means to said second venturi-scrubber means when said vessel is tilted to its second position and for closing said valve means to prevent the inflow of air therethrough when said vessel is in its first position.

45. The system set forth in claim 44 and including a source of a non-oxidizing gas, second valve means for coupling said source to said gas collecting hood means, said second valve means being operative to deliver said non-oxidizing gas to said hood means when said vessel is tilted to its second position.

\* \* \* \* \*

UNITED STATES PATENT OFFICE
CERTIFICATE OF CORRECTION

Patent No. 3,908,969      Dated September 13, 1975

Inventor(s) Kurt Baum et al

It is certified that error appears in the above-identified patent and that said Letters Patent are hereby corrected as shown below:

Claim 7, Column 11, line 49, after "and" insert --hood--.

Claim 10, Column 12, line 17, change "includng" to --including--.

Claim 11, Column 13, line 2, change "in" to --is--.

Signed and Sealed this third Day of February 1976

[SEAL]

Attest:

RUTH C. MASON
Attesting Officer

C. MARSHALL DANN
Commissioner of Patents and Trademarks